April 28, 1925.
F. W. SPRINGER
1,535,956
ELECTRIC LIGHTING AND STARTING SYSTEM FOR MOTOR VEHICLES
Original Filed March 22, 1917   2 Sheets-Sheet 1
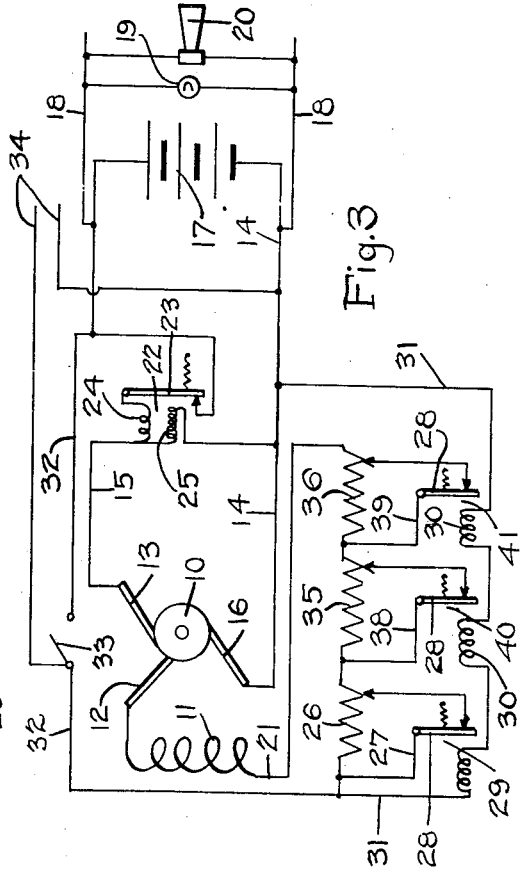
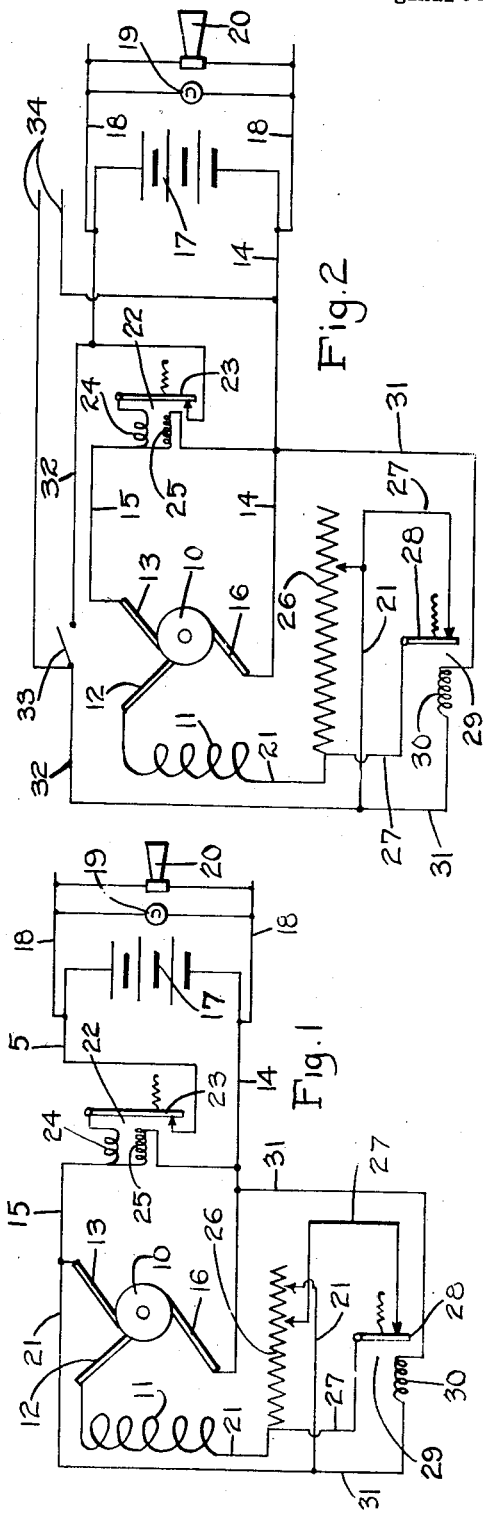
Inventor:
Franklin Wesley Springer April 28, 1925.
F. W. SPRINGER
1,535,956
ELECTRIC LIGHTING AND STARTING SYSTEM FOR MOTOR VEHICLES
Original Filed March 22, 1917   2 Sheets-Sheet 2
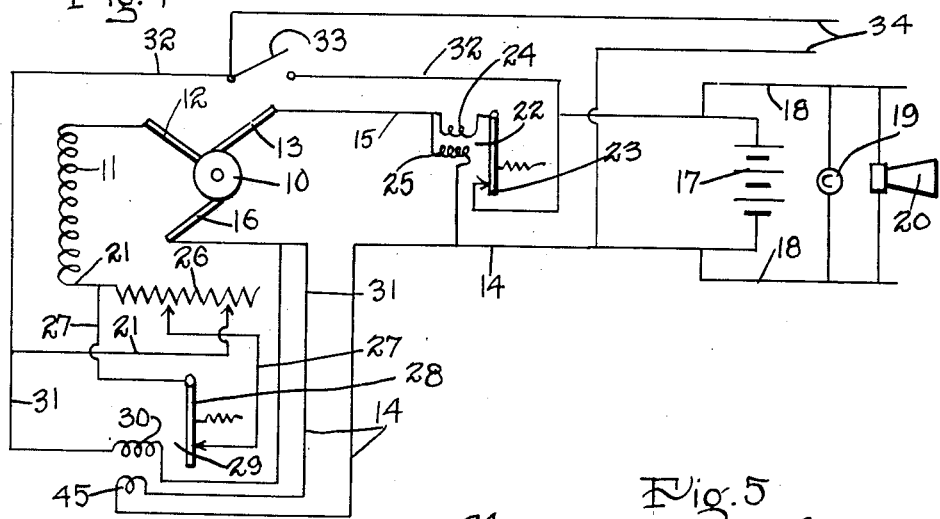
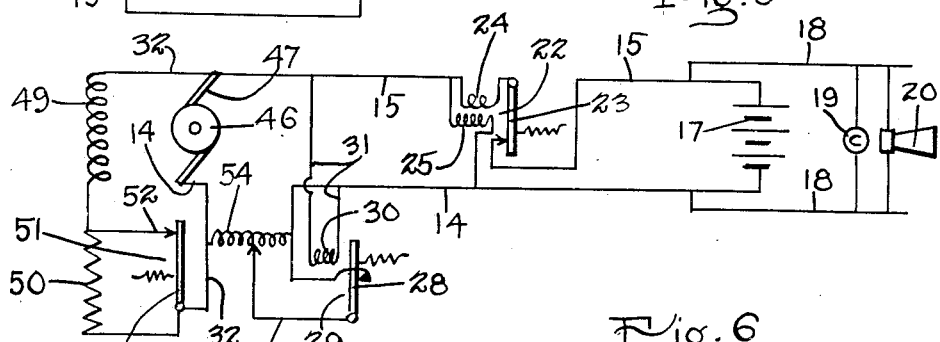
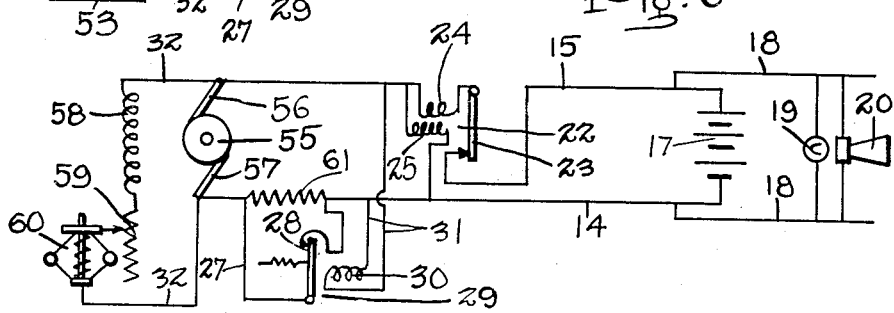
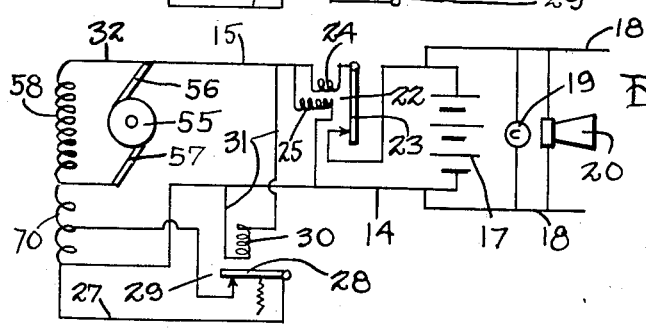
Inventor:
Franklin Wesley Springer Patented Apr. 28, 1925.

1,535,956

UNITED STATES PATENT OFFICE.

FRANKLIN WESLEY SPRINGER, OF MINNEAPOLIS, MINNESOTA.

ELECTRIC LIGHTING AND STARTING SYSTEM FOR MOTOR VEHICLES.

Application filed March 22, 1917, Serial No. 156,759. Renewed July 3, 1923.

*To all whom it may concern:*

Be it known that I, FRANKLIN WESLEY SPRINGER, a citizen of the United States, residing at Minneapolis, in the county of Hennepin and State of Minnesota, have invented a new and useful Improvement in Electric Lighting and Starting Systems for Motor Vehicles, of which the following is a specification.

My invention relates to charging generators for motor vehicles and has for its object to provide a generator which will automatically charge the storage battery at two or more different rates or charging characteristics, depending upon the state of charge of the battery. My invention is designed particularly for use in connection with the so-called constant current types of generators, so that they may be arranged to operate automatically on two or more charging rate characteristics as the varying demands of service may require, at all times automatically keeping the storage battery at or near the fully charged state without unnecessary over-charging. The device may also be used with the constant voltage charging generators, although such use may not be so necessary as in the case of constant current generators. Another object of the invention resides in providing a second charging characteristic of relatively flat shape with practically constant current slightly over and above the lighting demands of the motor vehicle so that a uniform lighting of the motor vehicle is secured, especially at high speeds, which current may rise above the current obtainable when the generator is operated to charge in accordance with its original characteristic.

A still further object is to provide means for separately exciting the field of the generator upon starting the generator so as to cause it to positively build up at all times.

A still further object of the invention is to provide a single device for performing the functions of my invention so that a greatly simplified and positively acting construction may be secured. In carrying out my invention I employ primarily a potential relay which is rendered operative by the rise in potential during the charge of the battery and particularly that rise in voltage which occurs when the battery is nearly or fully charged. This relay is connected to short circuit an adjustable resistance which is placed in series with the field of the generator so as to vary the field flux in accordance with the state of charge or discharge of the battery so that a high charging rate may be secured when the battery voltage is low or a low average charging rate may be secured when the battery is more fully charged.

The full objects and advantages of my invention will appear in connection with the detailed description and are particularly pointed out in the claims.

In the drawings illustrating the application of my invention in different forms:

Figure 1 is a diagrammatic view of a charging generator and storage battery system having my invention applied thereto. Figure 2 is a view similar to Figure 1 of a modification of the invention. Figure 3 is a view similar to Figure 2 of a still different form of my invention. Figure 4 represents a system similar to that shown in both Figures 1 and 2 but having an over-compounded potential relay adapted to operate more sensitively when the so-called constant current reaches a maximum. The series coil may be connected differentially so as to compensate for the IR drop of the lines between the relay and the battery so that the relay may operate, for example, as though connected directly to the battery. Figure 5 is a view of my invention applied to a constant current generator employing a rapidly vibrating current regulator of ordinary construction. Figure 6 shows my invention applied to a constant voltage generator. Figure 7 is a view of a compound generator showing one application of my invention thereto.

In ordinary practice with the constant current generators the battery is continuously charged at a substantially fixed rate or charging characteristic, depending upon the type of generator or the system used, which is usually such a rate as will meet the maximum demands. This has the effect of frequently over-charging the battery during ordinary use which it is well known causes the battery to gas, thereby wasting material and also quickly deteriorating the plates of the battery. In my invention I overcome these difficulties by reducing the charging current by means of a potential relay placed across the battery and generator line, which relay may operate to reduce the current in a number of ways now to be explained.

One method of employing my invention is shown in Figure 1. An ordinary constant current charging generator 10 is shown in the drawings. This machine may be of the third brush inherent regulation type having a field coil 11 connected across two of the brushes 12 and 13 by a line 21 and a supply line 14,—15 connected across the brush 13 and the remaining brush 16. Generator 10 delivers current to a storage battery 17 which is directly connected across the line 14,—15 and said generator and battery provide current to a service line 18 in which may be connected lamps 19, a horn 20 or any other electrical devices desired. In the line 14,—15 is connected a cut-out device 22 which comprises a spring returned armature 23 and an electromagnet having coils 24 and 25 adapted to operate the armature 23 to make or break the circuit controlled thereby. Coil 25 is connected across the line 14,—15 while coil 24 is connected in series with the armature 23 in the lead 15. When the generator voltage becomes greater than the battery voltage, coil 25 is rendered operative drawing up armature 23 which completes the circuit through lead 15 and causes the battery to be charged. Coil 24 is wound in the same direction as coil 25 and hence assists in holding armature 23 up. When, however, the engine is slowed down and generator 10 fails to generate sufficient electro-motive force, the current in line 14,—15 reverses, and the battery tends to operate the generator as a motor. This causes a differential action of the coils 24 and 25 which neutralizes the magnetic pull of the magnet and releases the armature 23 which breaks the line circuit from the battery to the generator.

In the field line 21 I connect a variable resistance 26 all or a part of which may be shunted by a short-circuited line 27 through the armature 28 of a relay 29. The actuating coil 30 of this relay is directly connected across line 14,—15 on the generator side by a line 31. In normal operation the short-circuit 27 is closed so that the full amount of field current is obtained. As the battery becomes charged, the voltage is raised till a point is reached at which the relay 29 becomes operative. Circuit 27 is then broken and the generator field becomes connected in series with resistance 26, so that the field current is reduced and consequently the charging current of the generator is reduced. This latter resistance may also be varied as indicated in the drawings so that any secondary charging current may be obtained.

With a storage battery of 3 cells such as is ordinarily used with motor vehicles, a normal pressure of about 6.5 volts is required to charge the battery. After the voltage rises to 7.5 the battery is fully charged and the current generating capacity of the generator is reduced by the device just described. This necessitates setting the relay 29 to become operative at about 7.5 volts. In starting the system coil 25 is also wound to cut in the line 15 through armature 23 at about 7.5 volts maximum. If it should now happen that relay 29 should become operative before coil 25 of the device 22, then the generator voltage characteristic would be immediately lowered and the generator would build up to 7.5 volts only at a higher speed, and might even fail to build up enough to cut-in at usual speeds. To remedy this defect, relay 29 is set to operate slightly above the voltage required to operate coil 25, causing the battery to become more fully charged before the charging current is reduced than would have otherwise resulted.

Another method of overcoming this last named difficulty is indicated in Figure 2. The principal difference in this device over the other lies in the connection of the field coil. Here one of the leads 32 of the field circuit 21 is connected to the battery side of the lead 15 and has connected in it a switch 33 which may be the ignition switch of the engine, the ignition primary line being incompletely indicated at 34 in Figure 2. When switch 33 is closed to start the engine, field coil 11 becomes separately excited from the battery until the generator is built up and then is excited in the usual manner, thus insuring positive building up. With this construction relay 29 can be set for 7.5 volts as before specified, or for any other appropriate voltage. This becomes evident for while the generator is building up, current is being taken from the battery for excitation purposes which would be about 6 volts and hence could not operate relay 29. Only after lead 15 has been cut in through armature 23 does the generator produce excitation current and then only in conjunction with the charging of the battery. At this time if the generator voltage were high enough to operate relay 29 it would mean that the battery was over-charged, in which case the device would be performing the function for which it was designed. It is to be noted that my potential relay would operate equally well in systems having or not having a reverse current relay cut out.

In Figure 2 no variable resistance is placed in the field circuit when the short-circuit 27 is closed as is the case with the construction shown in Figure 1. This result is produced by connecting together the two movable leads shown in conjunction with resistance 26 in Figure 1.

If desired, a plurality of different field-resistances may be provided which shall be automatically cut in as the battery voltage varies to give several different rates of charge, depending upon the condition of discharge of the battery. One such scheme is brought out in Figure 3. This system differs only from that shown in Figure 2 in that two additional resistances 35 and 36 are employed which are connected in series with resistance 26 in the field circuit 21, all of said resistances being individually provided with short-circuits 27, 38 and 39 which are independently controlled by armatures 28 of relays 29, 40 and 41, all having their magnet coils 30 connected in series in the previously mentioned circuit 31. These relays are set so that as the generator voltage rises, one after the other of said relays becomes operative, thus breaking its short circuit and cutting into the field circuit the section of the resistance controlled therewith. If desired said coils may be connected in parallel across the line instead of in series. The same result may be obtained by having one relay operating several contacts, each one made at a desired pressure.

Some of the so-called constant current generators produce a current which is a minimum at both extreme high and low speeds and which is a maximum at some intermediate speed. If the vehicle engine should be run continuously at the speed producing the maximum current, charging of the battery would occur at a much more rapid rate, and injuries due to over-charge may be more apt to occur. It hence may become desirable to render my invention more sensitive at the maximum charging current. This I produce as follows, as is shown in Figure 4. Relay 29 is in this instance provided with a compound winding 45 which is connected in series in one of the line wires 14. This coil is accumulatively connected so that when the current in the line becomes a maximum both of the coils operate together upon the relay armature 28 to cause it to be drawn up sooner than would otherwise have been the case when only the potential coil was used. Thus injury to the battery is impossible, as rapid over-charging is quickly checked, and a reduced charging current cut in. As already noted the series coil may be connected differentially with different results.

My present understanding of the theory and mode of operation of my invention whereby at least two different charging characteristics may be secured, and the reasons why a system built in accordance with said invention will at all times, during the varied conditions of operation of a motor vehicle and demands on the generator and storage battery, keep the storage battery at or near fully charged state without unnecessary overcharging, thus very materially lengthening the usual and accepted life of the battery, and providing a better current supply to the translating devices connected thereto, is as follows: Referring to Fig. 1, by way of illustration, the third brush generator 10, as is well known, operates with a falling characteristic with the third brush in a position as for example as illustrated in Fig. 1, that is, it is of the type, for example, as pointed out in the first sentence of the preceding paragraph. Assuming that the genereator 10 has started from rest and increases in speed, at a predetermined speed the voltage generated will be sufficient to effectively energize coil 25 whereupon cut-out 22 will close and charging begins at a small rate, depending upon the adjustment of the cut-out 22. Upon further rise in speed, the charging rate increases to a maximum along a current-speed characteristic of the type of a simple shunt generator, the current output rising substantially in proportion to the speed. As the speed rises still further, armature reaction begins to exert a very pronounced effect, the armature cross field driving more and more of the field flux from between the third brush 12 and the main brush 13, resulting in the well known falling characteristic giving at higher speeds a minimum current output, still sufficient to supply the ordinary minimum demands on the battery while the vehicle is running, both maximum and minimum outputs depending on the adjustment of the third brush. Assume now, while the generator is operating, at medium speed, on the rising portion of the characteristic at or near the maximum output, that a selected resistance 26 is cut into the circuit of the field winding 11. The current through that winding will be reduced, and with it the flux, generator voltage, and output. The reduction in output will be substantially proportional to the amount of resistance introduced. Assume now that the vehicle and therefore the generator are speeded up so that, if the resistance were not in the circuit, the generator output would be the predetermined minimum hereinbefore noted. If we assume the resistance to be inserted at this stage, the first effect will be to lower the magnetomotive force of the field winding 11 thus tending to lower the voltage at the brushes 13, 16 and the current output. The reduction of the current output will however decrease the armature cross field and more flux will therefore appear between brushes 12, 13, thus increasing the potential across winding 11 and therefore bringing the flux produced by that winding and therefore the generator voltage and current output up again to a predetermined value commensurate with the output at the lower speeds with the resistance in circuit. It is therefore clear that the effect of the introduction of resistance 26 on the original generator characteristic is radically different for the rising portion and the falling portion. It follows that the characteristic curve is flattened by the introduction of a resistance 26. The values of the output or current ordinates of this characteristic curve are of course predetermined by the selected value of resistance 26 having regard for the various demands on the battery.

In Figure 5 my invention is shown as applied to another type of constant current generator. This machine is of the two-brush type, having an armature 46, and brushes 47 and 48 which are connected to the main line 14,—15 of any of the modifications heretofore shown. A field coil 49 is connected at one end to line 15 and is connected in series with a resistance 50 at its other end to the line 14. A rapidly vibrating automatic resistance controlling switch 51 having a fixed contact 52, an armature 53 and an actuating coil 54 is connected with the contact 52 on one side of resistance 50 and the armature 53 on the other side of the resistance so that as the device is operated said resistance is alternately shorted and cut in to successively change the field excitation. The actuating coil 54 is connected in series in the line 14 and the resistance 50 is of such a magnitude that the current delivered by the generator when said resistance is cut in is considerably below normal and when the resistance is shorted is considerably above normal. This together with the proper tensioning of the armature spring has the effect of producing an unbalanced or unstable system which can not remain set for an extended period of time in any one position. As a result, armature 53 is caused to vibrate at a very high rate of speed so as to incessantly change the current from high to low, the rate of vibration being exceedingly high, the relative time of contact and non-contact varying with the speed of the engine so that the delivered current is practically constant. It is to be noted that the field flux merely tends to follow the wide and rapid changes in field current. In applying my invention to this form of generator I merely connect coil 30 across the line 14,—15 as in any of the other forms and connect the armature 28 so as to normally short a part of the turns of the actuating coil 54 of the resistance controlling switch 51. When relay 29 operates, this causes the vibrator or armature 53 to operate on less current and hence causes the generator to deliver a smaller current.

Two rates or charging characteristics may be secured with a constant voltage type of generator by applying my invention thereto. One method of this application is shown in Figure 6. Here a two-brush machine having an armature 55 and a pair of brushes 56 and 57 connected to the line 14, 15 is shown. A field coil 58 is connected to line 15 at one end and with a resistance 59 at its other end which resistance may be automatically cut in and out by a governor 60 connected to the armature shaft and completing the circuit through resistance 59 to the other line 14. In this system I merely insert a resistance 61 in series in line 14 and employ a relay 29 to operate it as in any of the other forms, the relay merely shorting and cutting in the resistance as before stated. If desired the resistance could be placed in series with the field coil 58 and the same controlled as shown in Figures 1, 2 or 4, with similar results.

In Figure 7 a differentially compounded generator is shown in which a series coil 70 is substituted for the governor control mechanism 59, 60 of Figure 6 shown therein, which coil is connected in line 14. In applying my invention to this device the same may be connected so as to cut in or cut out a number of the turns of the series coil which affects the resultant field flux and hence causes the generator to deliver current at two charging characteristics. Instead of short-circuiting a portion of coil 70 the whole may be shunted by a circuit having a resistance in it, thus producing the same effect.

It hence becomes clear that my invention may be used with any form of generator either of the constant voltage or of the constant current type and with or without a reverse current relay cut out. The device is extremely simple and is positive in action, requiring no attention after being once set.

A properly adjusted generator of the third-brush type may not overcharge the battery on long drives at high speeds; and on the other hand it may maintain the charge in the battery for short drives at low speeds and many starts of the engine. But this does not take care of battery demand variations, such as occur in the use of the car in summer and winter, and hence no one generator setting or charging rate provides for all conditions of use. Hence it is advisable to have at least two charging rates between which all variations in the demand on the battery over a period of a week or so will be cared for. This is provided for by the use of the relay. It may also be desirable to provide a relay having a bucking series coil so proportioned relatively to the potential coil that the relay may respond to battery voltage or battery charge conditions practically irrespective of the charging rate. This is shown in Fig. 4 and may be readily applied to the other forms shown.

As shown in Figs. 1, 5, 6 and 7, the relay is in parallel with the generator field, armature, and the potential coil of the automatic switch at all times. In this case the generator will go into action on the minimum charge rate unless the relay is set to operate at a higher voltage than the automatic switch. On the other hand, as shown in Figs. 2, 3 and 4, the relay is responsive to the battery or to the battery charging only. This leaves the automatic switch to alone respond to the rising generator voltage so that the generator shall always go in on the maximum rate. This is important since it would be difficult to adjust and maintain in relative adjustment the relay and the automatic switch as shown in Figs. 1, 5, 6 and 7 to accomplish this.

In the device as shown, for instance, in Fig. 1 it will be seen that provision is made for maximum adjustment at the left of the resistance coil 26 and for minimum adjustment at the right of said coil. This provision may be employed in any of the forms shown. Both maximum and minimum adjustments may be obtained by variation of the position of the third brush 12. It is also evident that adjustment for maximum and minimum rate may be made by varying the spring tension of the armature 28 of the relay and also by varying the position of this armature relatively to its pole. In Figs. 1, 5, 6 and 7 the relay is connected to the generator and until the generator is charging the battery responds to generator voltage only and may go in on a minimum charge of the relay is set for a lower voltage than is the automatic switch. But after the generator is charging the relay responds to battery voltage with the charging current. In Figs. 2, 3 and 4 the relay is on the battery when the ignition switch is closed and is off when the ignition switch is open. This arrangement is of advantage since the relay is never on all night and since it is on the battery while the generator is building up, so that the generator goes in on a maximum charging rate and a minimum engine speed.

Upon starting there is a flow through the part of the armature between the brushes 12 and 13, Figs. 2, 3 and 4, on closing the battery field circuit. As the generator speeds up with no load, then there is counter electromotive force in the part of the armature between 12 and 13, but normally the electromotive force in the portion of the armature between the brushes 12 and 16, due to separate excitation, is sufficiently in excess of the counter electromotive force so that the generator readily builds up to a point where the automatic switch is cut in. Then the load comes on and armature reaction drives the field flux toward and into the region between 12 and 13, thus controlling the output of the generator by weakening the voltage on the field terminals between 12 and 16 in the manner common to the third-brush generator. The revolution of the armature of course is counter-clockwise for Figs. 1 to 4 inclusive, and may be in either direction in Figs. 5, 6 and 7.

I claim:

1. An electrical system comprising a third-brush generator having a field coil, a battery, means for connecting the field coil with the third brush and the battery so that the field coil receives at starting a separate exciting current from the battery through a portion of the armature winding of the generator, and means for reducing the charging current when the charging voltage reaches a predetermined point.

2. An electrical system comprising a third brush generator having a field coil, a battery, a circuit connecting the field coil with the third brush and battery so that the field coil receives at starting a separate exciting current from the battery through a portion of the armature winding of the generator, an automatic switch for breaking the circuit between said battery and generator when the latter is inoperative, and a relay for reducing the charging current when the charging voltage reaches a predetermined point.

3. An electrical system comprising a third brush generator having a field coil, a battery, a circuit connecting the field coil with the third brush and battery so that the field coil receives at starting a separate exciting current from the battery through a portion of the armature winding of the generator, a variable resistance in the field circuit of the generator, and a relay for cutting in said resistance when the charging voltage reaches a predetermined point.

4. An electrical system comprising a third brush generator having a field coil, a battery, a circuit connecting the field coil with the third brush and battery so that the field coil receives at starting a separate exciting current from the battery through a portion of the armature winding of the generator, and a relay adjustable for a minimum rate for reducing the charging current when the charging voltage reaches a predetermined point.

5. An electrical system comprising a third brush generator having a field coil, a battery, a circuit connecting the field coil with the third brush and battery so that the field coil receives at starting a separate exciting current from the battery through a portion of the armature winding of the generator, and a relay adjustable for a maximum rate for reducing the charging current when the charging voltage reaches a predetermined point.

6. An electrical system comprising a third brush generator having a field coil, a battery, a circuit connecting the field coil with the third brush and battery so that the field coil receives at starting a separate exciting current from the battery through a portion of the armature winding of the generator, and a relay adjustable for a maximum and minimum rate for reducing the charging current when the charging voltage reaches a predetermined point.

7. An electrical system comprising a third brush generator having a field coil, a battery, a circuit connecting the field coil with the third brush and battery so that the field coil receives at starting a separate exciting current from the batery through a portion of the armature winding of the generator, a resistance in the field circuit of the generator, said resistance being variable for a maximum and minimum rate, and a relay for cutting in said resistance when the charging voltage reaches a predetermined point.

8. An electrical system comprising a third brush generator having a field coil, a battery, a circuit connecting the field coil with the third brush and battery so that the field coil receives at starting a separate exciting current from the battery through a portion of the armature winding of the generator, an automatic switch adjustable for a maximum and minimum rate for breaking the circuit between said battery and the generator when the latter is inoperative, and a relay adjustable for a maximum and minimum rate for reducing the charging current when the charging voltage reaches a predetermined point, said third brush being adjustable for a maximum and minimum rate.

9. An electrical system comprising a generator having an armature and a field coil, a battery, a line connecting said battery with said armature, an ignition system, a circuit connecting the field coil and the ignition system with one side of the line, a circuit connecting said armature with said line, a relay connected across said line for regulating the charging current, said relay being rendered operative when the charging voltage reaches a predetermined point, and means actuated by said relay for reducing the charging current of said generator.

10. An electrical system comprising a battery, a third brush generator having a field coil and armature, a line connecting said armature and battery, a field circuit connecting said field coil with the third brush and one side of said line so that the field coil receives at starting a separate exciting current from the battery through a portion of the armature winding of said generator, a relay connected across said line and rendered operative when the charging voltage reaches a predetermined point, and means actuated by said relay for reducing the charging current of said generator.

11. An electrical system comprising a third brush generator having an armature and field coil, a battery, a line connecting said armature and battery, an ignition system, a circuit connecting the field coil and ignition system with the third brush and one side of the line, a circuit connected with said last-named circuit at a point intermediate the ignition system and field coil and with the opposite side of the line, a switch in the last-named circuit, a relay connected across said line and rendered operative when the charging voltage reaches a predetermined point, and means actuated by said relay for reducing the charging current of said generator.

12. An electrical system comprising a line, a battery connected therewith, a third brush generator having a field coil and an armature, a circuit connecting said armature with the line, an automatic switch in said armature circuit adapted to be closed by current from said generator, a normally-open circuit connecting said field coil with a third brush and with one side of said armature circuit at a point between said automatic switch and said battery, a relay connected across said line and rendered operative when the charging voltage reaches a predetermined point, and means actuated by said relay for reducing the charging current of said generator.

13. An electrical system comprising a generator having main and auxiliary brushes, a field coil adapted to be energized from said brushes, a battery connected with said generator and adapted to be charged thereby, means for connecting said battery with said field coil through a portion of the armature winding of said generator for separate excitation of the generator, and a relay for reducing the charging current when the charging voltage reaches a predetermined point.

14. An electrical system comprising a generator having main and auxiliary brushes, a field coil connected to the auxiliary brush, a battery connected to the main brushes and adapted to be charged from said generator, an automatic switch for breaking the circuit between said battery and the main brushes when the generator is inoperative, means for connecting said battery ahead of said switch to said field coil through a portion of the armature winding of said generator for separate excitation of the generator, and a relay for reducing the charging current when the charging voltage reaches a predetermined point.

15. The combination of an engine, a generator having main and auxiliary brushes, a battery connected to said main brushes and adapted to be charged from said generator, a field coil connected to the auxiliary brush, an ignition system for said engine operated from said battery, a circuit for connecting said ignition system and said field coil with said battery, means for connecting said battery with said field coil through a portion of the armature winding of said generator for separate excitation of the generator, and a relay for reducing the charging current when the charging voltage reaches a predetermined point.

16. The combination of an engine, a generator having main and auxiliary brushes, a battery connected to said main brushes and adapted to be charged from said generator, a field coil connected to the auxiliary brush, an ignition system for said engine operated from said battery, a circuit for connecting said ignition system and said field coil with said battery, a switch for simultaneously closing said circuit and rendering said ignition system operative upon starting the engine and for simultaneously opening said circuit and rendering said ignition system inoperative upon stopping the engine, and a relay for reducing the charging current when the charging voltage reaches a predetermined point.

17. An electrical system comprising a generator having a falling characteristic at high speeds, a field coil for said generator, a battery, a circuit connecting said field coil and said battery for supplying a separate exciting current at starting which is in excess of the normal excitation current, a switch in said circuit, and a relay for reducing the charging current when the charging voltage reaches a predetermined point.

18. An electrical system comprising a generator having a falling characteristic at high speeds, a field coil for said generator, an ignition system, a battery, a circuit connecting said field coil and said battery for supplying a separate excitation current at starting which is in excess of the normal excitation current, said circuit having a lead in common with the ignition system, a switch in said common lead for causing simultaneous operation of the ignition system and separate excitation of the generator upon starting, and a relay for reducing the charging current when the charging voltage reaches a predetermined point.

19. In combination with the ignition system of a motor vehicle, a generator having an armature and a field coil, a battery, a line connecting said battery with said armature, a circuit connecting the field coil and ignition system with one side of the line, a circuit connected with said last-named circuit at a point intermediate the ignition system and the field coil and with the opposite side of the line, a switch in said last-named circuit which simultaneously opens and closes circuits from the battery through the ignition system and the field coil, a relay connected across said line and rendered operative when the charging voltage reaches a predetermined point, and means actuated by said relay for reducing the charging current of said generator.

20. In combination with the ignition system of a motor vehicle, a generator having an armature and a field coil, a battery, a line connecting said battery with said armature, a circuit connecting the field coil and ignition system with one side of the line, a circuit connected with said last-named circuit at a point intermediate the ignition system and the field coil and with the opposite side of the line, a switch in said last-named circuit which simultaneously opens and closes circuits from the battery through the ignition system and the field coil, a circuit connecting said armature with said line, an automatic switch in said armature circuit which is closed by current from said generator, a relay connected across said line and rendered operative when the charging voltage reaches a predetermined point, and means actuated by said relay for reducing the charging current of said generator.

21. In combination with the ignition system of a motor vehicle, a generator having main and auxiliary brushes, a field coil connected to the auxiliary brush, a battery, a line connecting said battery with the main brushes, a circuit connecting the field coil and ignition system with one side of the line, a circuit connected with said last-named circuit at a point intermediate the ignition system and the field coil and with the opposite side of the line, a switch in said last-named circuit which simultaneously opens and closes circuits from the battery through the ignition system and the field coil, means for connecting said battery with said field coil through a portion of the armature winding of said generator for separate excitation of the generator, a relay connected across said line and rendered operative when the charging voltage reaches a predetermined point, and means actuated by said relay for reducing the charging current of said generator.

22. In combination with the ignition system of a motor vehicle, a generator having main and auxiliary brushes, a field coil connected to the auxiliary brush, a battery, a line connecting said battery with the main brushes, a circuit connecting the field coil and ignition system with one side of the line, a circuit connected with said last-named circuit at a point intermediate the ignition system and the field coil and with the opposite side of the line, a switch in said last-named circuit which simultaneously opens and closes circuits from the battery through the ignition system and the field coil, means for connecting said battery with said field coil through a portion of the armature winding of said generator for separate excitation of the generator, an automatic switch in the armature circuit which is closed by current from said generator, a relay connected across said line, and rendered operative when the charging voltage reaches a predetermined point, and means actuated by said relay for reducing the charging current of said generator.

23. An electrical system comprising a generator, a battery, a line connecting said battery and said generator, and a relay for reducing the charging current when the charging voltage reaches a predetermined point, said relay having a potential coil and a series coil differentially connected whereby the relay may respond to battery charge conditions substantially irrespective of the charging rate.

24. An electrical system comprising a third-brush generator having a field coil, a battery, a circuit connecting the field coil with the third brush and the battery so that the field coil receives at starting a separate exciting current through a portion of the armature winding of the generator, and a relay for reducing the charging current when the charging voltage reaches a predetermined point, said relay having a potential coil and a series coil differentially connected whereby the relay may respond to battery charge conditions substantially irrespective of the charging rate.

25. An electrical system comprising a generator, a battery, a line connecting said battery and said generator, an automatic switch for breaking the circuit between said battery and said generator when the latter is inoperative, and a relay for reducing the charging current when the charging voltage reaches a predetermined point, said relay having a potential coil and a series coil differentially connected whereby the relay may respond to battery charge conditions substantially irrespective of the charging rate.

26. An electrical system comprising a third-brush generator, having a field coil, a battery, a circuit connecting the field coil with the third brush and the battery so that the field coil receives at starting a separate exciting current through a portion of the armature winding of the generator, an automatic switch for breaking the circuit between said battery and said generator when the latter is inoperative, and a relay for reducing the charging current when the charging voltage reaches a predetermined point, said relay having a potential coil and a series coil differentially connected whereby the relay may respond to battery charge conditions substantially irrespective of the charging rate.

27. The combination of an engine, a generator, a battery adapted to be charged from said generator, a field coil for said generator, an ignition system for said engine, means for simultaneously opening and closing circuits through the ignition system and the field coil, an automatic switch for breaking the circuit between said battery and said generator when the latter is inoperative, and a relay for reducing the charging current when the charging voltage reaches a predetermined point, said relay having a potential coil and a series coil differentially connected whereby the relay may respond to battery charge conditions substantially irrespective of the charging rate.

28. The combination of an engine, a third brush generator having a field coil, a battery, a circuit connecting the field coil with the third brush and the battery so that the field coil receives at starting a separate exciting current through a portion of the armature winding of the generator, an automatic switch for breaking the circuit between said battery and said generator when the latter is inoperative, an ignition system for said engine, means for simultaneously opening and closing circuits through the ignition system and the field coil, and a relay for reducing the charging current when the charging voltage reaches a predetermined point, said relay having a potential coil and a series coil differentially connected whereby the relay may respond to battery charge conditions substantially irrespective of the charging rate.

29. The combination of an engine, a generator having a field coil, a battery adapted to be charged from said generator, an ignition system for said engine, means for simultaneously turning on the ignition system and separately exciting the generator field and for simultaneously turning off the ignition system and the separate excitation of the field, and a relay for reducing the charging current when the charging voltage reaches a predetermined point.

30. The combination of an engine, a third-brush generator having a field coil, a battery adapted to be charged from said generator, an ignition system for said engine, means for simultaneously turning on the ignition system and separately exciting the generator field and for simultaneously turning off the ignition system and the separate excitation of the field, and a relay for reducing the charging current when the charging voltage reaches a predetermined point.

31. An electrical system comprising a third brush generator having a field coil, a storage battery, a circuit connecting the field coil with the third brush and the battery so that the field coil receives at starting a separate exciting current from the battery through a portion of the armature winding of generator, said field coil being connected to the third brush and to one of the main brushes, said brushes embracing that part of the field under the leading pole tip, and a relay for reducing the charging current when the charging voltage reaches a predetermined point.

32. In an electric lighting and starting system for motor vehicles, the combination with a third brush generator operating with a falling current-speed characteristic and having a shunt field winding only, of a battery, means for connecting said generator to said battery, a resistance, and means responsive to a characteristic of the battery energy supplied by said generator to said battery for inserting said resistance in the circuit of said field winding.

33. In an electric lighting and starting system for motor vehicles, the combination with a third brush generator operating with a falling current-speed characteristic and having a shunt field winding only, of a battery, means for connecting said generator to said battery, a resistance, and means responsive to the voltage across said battery for inserting said resistance in the circuit of said field winding.

34. In an electric lighting and starting system for motor vehicles, the combination with a third brush generator operating with a falling current-speed characteristic and having a shunt field winding only, of a battery, means for connecting said generator to said battery, a resistance, and means including an electromagnetic operating winding responsive to the voltage across said battery for inserting said resistance in the circuit of said field winding.

35. In an electric lighting and starting system for motor vehicles, a battery, vehicle lamps, means for supplying current of at least two different current-speed characteristics to said battery and said lamps and maintaining said battery at substantially full-charge voltage during the operation of said vehicle whereby said lamps are supplied in parallel with a charging battery while said supplying means is operating, on either characteristic, comprising a generator of the third brush type having a shunt field winding, a resistance, and means for inserting said resistance in said field winding in response to a predetermined full-charge voltage and for removing said resistance in response to a voltage not lower than that corresponding to a substantially fully charged state.

36. In an electric lighting and starting system for motor vehicles, the combination with a generator providing predetermined high outputs at certain speeds and predetermined lower output at higher speeds, of a battery, means for connecting said generator to said battery, and means responsive to a predetermined maximum voltage across said battery for reducing said high outputs to a selected substantial value and maintaining said higher-speed outputs at values commensurate with said same selected value.

37. In an electric lighting and starting system for motor vehicles, the combination with a generator providing predetermined high outputs at certain speeds and predetermined lower outputs at higher speeds, of a battery, means including conductors for connecting said generator to said battery, vehicle lamps, means including elements other than generator parts only for electrically connecting said lamps to said conductors, and means responsive to a predetermined maximum voltage across said conductors for reducing said high outputs to a selected value and maintaining said higher-speed outputs at values commensurate with said same selected value.

38. In an electric lighting and starting system for motor vehicles, the combination with a third brush generator operating with a falling current-speed characteristic and having a shunt field winding only, of a battery, means for connecting said generator to said battery, a resistance, and means responsive to a predetermined full-charge charging voltage across said battery for inserting said resistance in the circuit of said field winding to thereby reduce the maximum charging current and for removing said resistance in response to a drop in voltage across said battery to a predetermined lower charging voltage.

39. In an electric lighting and starting system for motor vehicles, the combination with a third brush generator having a shunt field winding only and operable to provide predetermined high outputs at certain speeds and predetermined lower outputs at higher speeds, of a battery, means for connecting said generator to said battery, and means for regulating the outputs including means responsive to a predetermined maximum charging voltage across said battery for reducing the outputs and for increasing the outputs in response to a drop in voltage across said battery to a predetermined lower charging voltage.

FRANKLIN WESLEY SPRINGER.

Witnesses:
E. A. REID,
W. T. RYAN.